MIXING APPARATUS

Original Filed June 22, 1959 3 Sheets-Sheet 1

INVENTOR.
ROBERT SLUIJTERS
BY Francis W. Young
ATTORNEY

MIXING APPARATUS

Original Filed June 22, 1959 3 Sheets-Sheet 2

INVENTOR.
ROBERT SLUIJTERS
BY Francis W. Young
ATTORNEY.

INVENTOR.
ROBERT SLUIJTERS
BY Francis W. Young
ATTORNEY

United States Patent Office

Re. 28,072
Reissued July 9, 1974

28,072
MIXING APPARATUS

Robert Sluijters, Arnhem, Netherlands, by Akzona Incorporated, Asheville, N.C., assignee Original No. 3,051,453, dated Aug. 28, 1962, Ser. No. 821,917, June 22, 1959. Application for reissue June 11, 1973, Ser. No. 368,911
Claims priority, application Netherlands, July 8, 1958, 229,424
Int. Cl. B01f *5/06*
U.S. Cl. 259—4 3 Claims

Matter enclosed in heavy brackets [ ] appears in the original patent but forms no part of this reissue specification; matter printed in italics indicates the additions made by reissue.

*ABSTRACT OF THE DISCLOSURE*

*A fluid mixer having no moving parts is disclosed in which a main stream of materials in a uniform cross-sectional conduit is divided into a number of substreams. The substreams are directly recombined in a manner that causes a direct and positive mixing of elements of the main stream. The positive mixing action allows precise control of the mixing action to the point of infinity, but may be concluded at any interim point.*

The present invention relates generally to the mixing of flowing streams of gaseous, liquid and/or granular media through the use of stationary baffles or pipe restrictors providing a tortuous flow path and more particularly to an improved apparatus for displacing portions or particles from a stream of previously combined materials relative one to the other in a specific manner in order to expedite thorough and homogenous intermixing of the combined materials.

Mixing apparatus of the type presently under consideration is generally known to this art, as thoroughly discussed in copending and commonly owned application Serial No. 774,305, filed November 17, 1958. Reference may be had to this application for an analysis of the disadvantages of previously known mixers or blenders employing stationary baffles.

The aforesaid copending application discloses a mixing process and apparatus designed specifically to obviate difficulties encountered with commercially available mixers. The system described therein divides a flowing stream into a plurality of partial streams and shifts one partial stream relative to others, as is known in this art, but also deforms or alters the cross-sectional shape of the partial stream to such an extent that the same overlaps or is caused to contribute to a plurality of partial streams on passage through the next subsequent mixing stage. The division and intermingling of partial streams of course may be continued as long as deemed necessary or desirable.

The system of mixing described above provides many advantages over known mixers. For example, it is possible, when mixing viscous substances, to predict exactly the mixing action and the result to be obtained, this result depending only on the construction of the mixing unit. Thus, it is possible to obtain a mixing action of any desired degree of uniformity. Moreover, only a fraction of the energy required of known mixers is utilized with the disclosed apparatus.

Notwithstanding the foregoing, however, it has now been found that the system described in said copending application Serial No. 774,305 also presents certain disadvantages which the present invention is intended to overcome. For example, the previously described system suggests as a preferred embodiment that the two substances or materials to be combined or blended be initially introduced one to the other in a concentric fashion. In other words, two concentric flowing streams must be provided before one can be introduced into the other. It appears now that deviations from the concentricity of the two initial streams produces non-uniform mixing. Moreover, although parts of the two substances which join one another are indeed intensively mixed, the partial streams as as entirety are not too thoroughly guided one through another.

A primary object of this invention is provide a mixing apparatus not having the disadvantages enumerated above.

Another object of the present invention is to provide a mixing apparatus which causes the substances to be mixed to flow together geometrically in an arbitrary manner, but without displacing the partial streams over long distances from the main stream.

Still another object of this invention is to provide a mixing apparatus having the advantages of that described hereinabove, but which is more economical to manufacture and easier to service.

An additional object of the present invention is to provide a mixing apparatus having the advantages enumerated above but which does not require a complicated system for introducing streams of substances thereto.

A further object of this invention is to provide a unitary or sectionalized baffle system which can be placed into the supply line of flowing materials in order to insure thorough and uniform homogenization thereof.

These and other objects may be accomplished in accordance with the present invention by providing a baffle system which divides a main stream containing substances to be blended into a number of branches or partial streams much in the manner of a family tree, displacing one partial stream with respect to adjacent partial streams while changing the cross-sectional shape thereof, and combining the partial streams in groups corresponding to the original dividing factor. Corresponding branches of the family tree arrangement, so to speak, are maintained at an equal distance from the main body thereof, and portions of one branch are combined with corresponding portions from other branches, as will appear more fully hereinafter.

The present invention is similar to that described in the aforesaid copending application in that the main stream is divided into several smaller streams, but this division now occurs stepwise, or progressively, rather than simultaneously. If, for example, the main stream is first divided into two branches, or partial streams, the next subsequent division will produce four new branches, two each from the original branches, and the next step of course would result in eight branches, and so forth. This system may be continued at will and any other dividing factor obviously could be used.

With the thus formed so-called family tree of partial streams, the branches so produced are spaced different distances one from the other. The distance between two branches taken in conjunction with the family tree, as used herein, is the geometrical length of a communicating line between the points at which said branches are formed, and measured along stream lines. It may be imagined, therefore, that the length is measured by going upstream from one of the dividing points to a point from which another dividing point can be reached upon following of another branch stream. Thus, the divisions or branches having only the original main stream as their common tree ultimately are located the greatest distance from one another.

By groupwise uniting of these divisions in numbers which always correspond to the dividing factor of the family tree, it was found that exchange of material from one part of the main stream to any other part could be attained in the shortest period of time. Consequently, the orientation of the original components in the main stream is of little importance. A most rapid mixing or blending is obtained when the branch streams are combined with other branch streams and again divided into different branches a number of times before uniting all of the branch streams into a modified or mixed main stream.

In this connection, however, it is important that each division or branch stream which follows the joining together of two prior branch streams be carried out in such a manner that other branch streams, and not the same prior branch streams, are formed upon subsequent divisions. This requirement is satisfied if the cross-sectional shape of the branch streams is altered immediately before the new division occurs. Consequently, each new branch stream formed will contain a portion of the immediately preceding branch streams, but the particles thereof will appear in a new relationship with respect to each other.

Although, as remarked above, it is possible in principle to divide and re-divide the main stream into groups of three, for example, or more partial streams, it is preferred according to this invention to utilize a dividing factor of two. It is even more preferable to divide and sub-divide into eight partial streams before uniting these streams pair-wise in the manner described. Not only is a more simple system now available, it has also been found that a more rapid and intensive mixing is possible, and in a more limited space.

Although various solutions to the mixing problem described are possible, and various cross-sectional shapes of the branch streams could operate successfully, it has been found that most efficient results are obtained if the main stream is first divided into branches having rectangular cross-section with a length-to-width ratio of 2:1, then altered into a square cross-sectional shape, and then reformed into a rectangular cross-section, but having a length-to-width ratio of 1:2.

A more thorough understanding of this invention will occur upon study of the following specific disclosure, taken in conjunction with the accompanying drawings, wherein.

According to this invention, as explained earlier, the proposed mixing apparatus should be constructed in such a way that the guide elements receiving the main stream from the supply conduit should first divide the same into a system of smaller streams which in themselves split up in the manner of a family tree, after which the most finely divided streams then join in groups corresponding to the initial division or dividing factor. The pattern of guide elements forming these divisions should repeat one or more times in the same geometric or symmetric order until the discharge end of the apparatus is reached. A mixer having a dividing factor of two will now be described with attention directed to the drawings.

Although a mixing apparatus consisting of interconnecting tubes disposed within a cylindrical housing could be utilized, a particularly compact and more simple unit performing the same function may be obtained through the use of a supply conduit having a square shape in cross-section. Only one vertical wall 10 and the bottom 11 of such a conduit appears in FIGURE 4, although portions 10', 11' of a complementary wall and top, respectively, have been shown in order to clarify passage of fluid through the apparatus. The walls, top and bottom intersect with and block off unused areas defined by the baffles, as illustrated.

Figure 6:
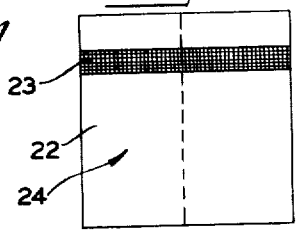
FIGURE 6 is a cross-sectional view of a material to be mixed or blended by the apparatus of FIGURE 4, illustrating by way of example a portion of black pigment disposed as a layer in a larger portion of white viscous material.
Figure 4:
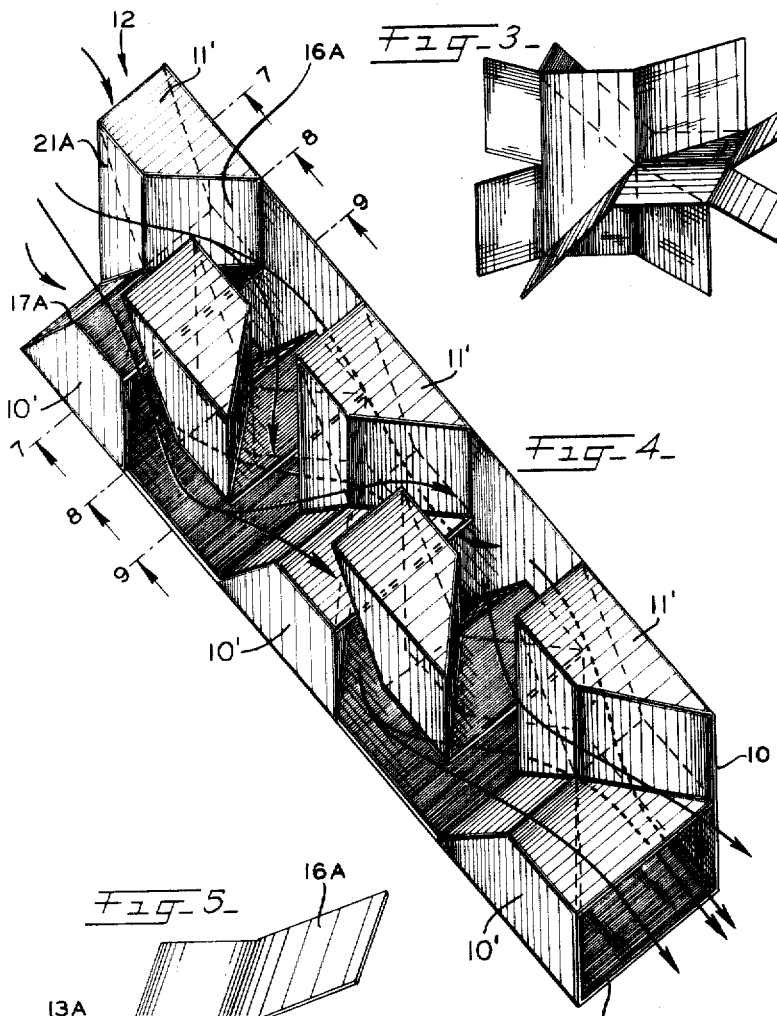
FIGURE 4 is a perspective view of a mixer apparatus constructed in accordance with this invention and assembled within a tubular supply conduit having a square cross-section, but showing only the lower wall and one side wall thereof, and omitting one group of tabs appearing in FIGURES 1, 2 and 3.

The mixing apparatus indicated generally at 12 in FIGURE 4 is snugly fitted within the tubular housing and serves to deflect, divide, and combine flowing streams in the manner shown by arrows, to be discussed more fully subsequently. Although the walls, top and bottom as illustrated have identical dimensions, this of course could be varied if desired. Moreover, the mixer shown by way of example first divides the main stream into two identical rectangular shapes, as viewed in cross-section, having a length-to-width ratio of 2:1, and then successively varies this shape to a ratio of 1:2, 2:1, 1:2, etc., as will be evident upon comparison of FIGURES 6 and 8.

Figure 1:
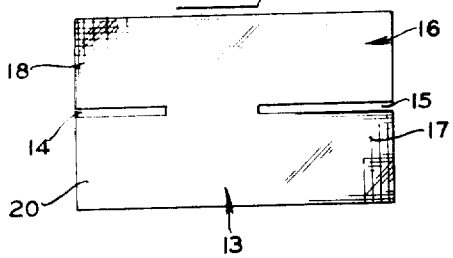
FIGURE 1 is a plan view of a component part of the mixer apparatus, if constructed in the most simple manner.

Thte baffle pieces, or guide elements, which may be identical except that successive mixing stages are reversed in a manner to be described, can conveniently be formed from a flat sheet or metal plate 13 suitably notched at 14, 15, as shown in FIGURE 1. The notch 15 should have a length greater than notch 14. The remaining tabs 18, 20, which are produced by notch 14, provide divider surfaces not appearing on the mixing apparatus shown in FIGURE 4, but which may be used as a leading edge to facilitate division into branch streams. Such additional dividers generally are necessary only when the flow through the mixer shown is turbulent in nature, and are not usually required for laminar flow. These tabs were omitted from FIGURE 4 so that the passage of branch streams therethrough can be more easily understood. The remaining flat portion 21 of the metal plate 13 forms a flat inner wall surface extending parallel to the longitudinal axis of the mixing apparatus and supply conduit. This surface, therefore, forms one of the inner walls which are coextensive with a transition area in one mixing stage.

Figure 2:
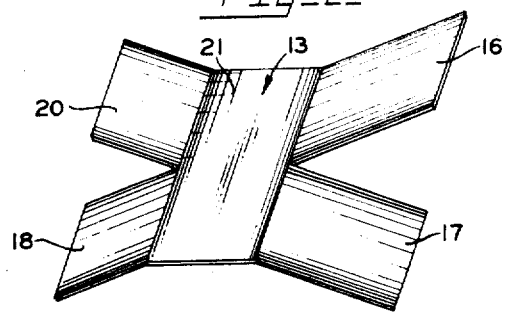
FIGURE 2 is a perspective view of the sheet metal part shown in FIGURE 1, but illustrating the bends necessary for assembly with other parts to produce a mixing stage.
Figure 3:
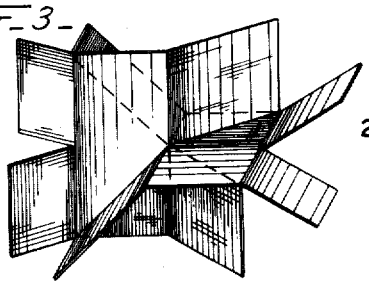
FIGURE 3 is a perspective view of two pre-formed sheet metal parts such as shown in FIGURE 2 in assembled condition to provided one mixing stage.

The metal plate 13 of FIGURE 1 should be bent or otherwise formed into the shape appearing in FIGURE 2, after which the same may be combined with a complementing plate to form a single mixing stage such as appears in FIGURE 3, wherein the incoming stream (traveling from the left of this figure to the right) is divided, transposed, altered in cross-sectional shape, and permitted to combine.

Figure 5:
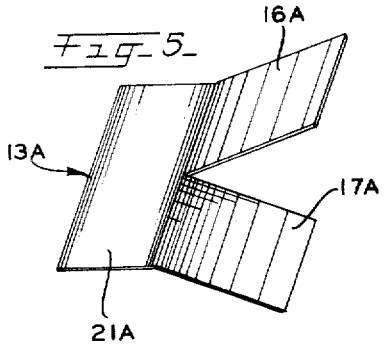
FIGURE 5 is a perspective view of an alternative sheet metal part that is used in constructing the apparatus appearing in FIGURE 4, there being required two of these sheet metal parts for each mixing stage.

The metal plane 13A shown in FIGURE 5 is provided only with the deflector surfaces 16A, 17A, and inner wall surface 21A, for reasons given above. A pair of these plates, opening toward each other so that the notches will interlock, form one stage of the apparatus appearing in FIGURE 4. These plates may be formed by injection molding, if desired, or they may be stamped from a continuous sheet. Moreover, they may be secured one to the other, and to the supply conduit if necessary, by welding, soldering, or in any other convenient manner. In some instances, it may be necessary only to force these elements together and into the conduit.

The tabs shown, of course, may be bent in either direction. In other words, the initial division of material may shift one section up and the adjacent section down, or vice versa. It should be pointed out, however, that the tabs of the two metal parts making up one mixing stage must be bent reversely from those on the adjacent mixing stages. Two of the parts shown in FIGURE 5 may be placed together in the manner indicated above to form one mxing stage. The two parts forming the next succeeding stage, however, must have tabs bent in the opposite direction, as will appear upon inspection of FIGURE 4.

Figure 10:
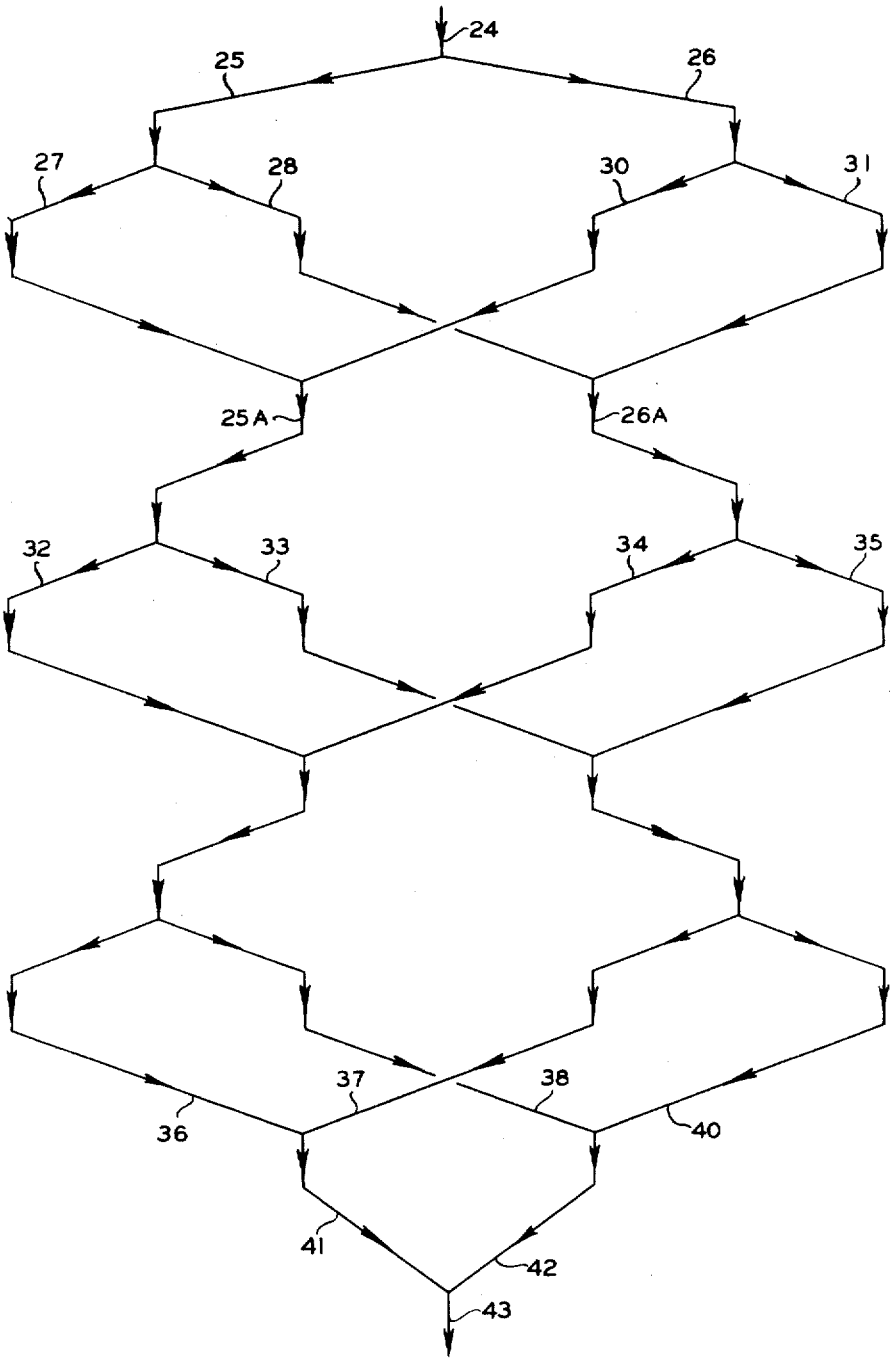
FIGURE 10 is a schematic flow sheet illustrating the manner in which the main stream is divided, combined, re-divided, etc., with the apparatus shown in FIGURE 4.

Operation of the apparatus shown in FIGURE 4 can best be understood by reference also to FIGURES 6–9, inclusive, and the flow sheet shown in FIGURE 10. A flowing stream of material 22 (indicated only by arrows in this figure), which has previously been injected with a pigment, for example, 23 is introduced into the mixer 12 from the upper left of FIGURE 4 and flows therethrough to emerge at the lower right of this figure. This main stream of combined materials is illustrated by line 24 in FIGURE 10. When this material enters the mixing apparatus, the leading edge of the first flat surface 21A (which happens to extend vertically, as indicated by dotted lines in FIGURE 6) divides the stream into first and second main branches, indicated at 25 and 26 in FIGURE 10. The same division of course would occur had divider tabs 18, 20 been utilized.

Figure 7:
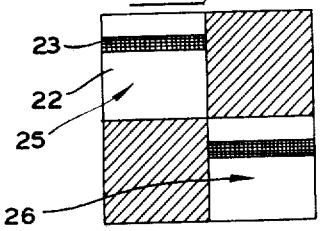
FIGURE 7 is a cross-sectional view, taken along the line 7—7 of FIGURE 4, and indicating the disposition of material after passage into the first mixing stage.
Figure 8:
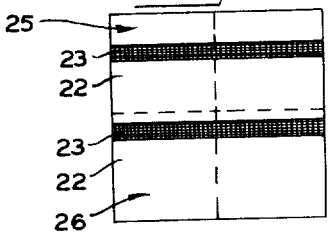
FIGURE 8 is a cross-sectional view taken along the line 8—8 of FIGURE 4, and illustrating the disposition of material when emerging from the first mixing stage.
Figure 9:
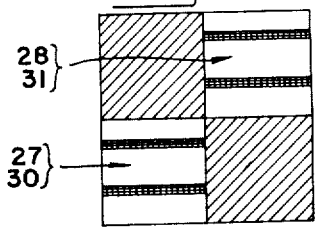
FIGURE 9 is a cross-sectional view taken along the line 9—9 of FIGURE 4, and illustrating entrance of the material into the next or second mixing stage.

Upon division into two main branches (25, 26, FIGURE 10) by the edge of first flat surface 21A (FIGURE 4), a first main branch (for example, 25) engages deflector plate 17A and is shifted upwardly while the cross-sectional shape thereof is simultaneously changed from rectangular (see FIGURE 6, the material on the left side of the dotted line) to square (see FIGURE 7, the material in the upper left corner). Since the area is reduced, the velocity of course is increased. The same occurs to second main branch 26, but it is shifted vertically downwardly by the deflector plate 16A appearing only in dotted lines in FIGURE 4. Upon leaving the transition area of square cross-section, each branch is widened and returned to its original shape, but with the longitudinal axis extending horizontally rather than vertically as when it entered the mixing stage. Everything above the horizontal dotted line in FIGURE 8 represents the branch 25, while everything therebelow represents branch 26. Moreover, it can be seen that upon passage into the next mixing stage one part of branch 25 will be channeled with one part of branch 26, the next dividing edge being represented by the vertical dotted line in FIGURE 8.

Upon discharge from the trailing edge of the second flat plate 21A in FIGURE 4 the two branches will appear as a main body such as shown in FIGURE 8. This condition never exists actually, however, because at the same instant the branches discharge from one wall plate 21A or immediately prior thereto, depending on mixer construction, they come into contact with a succeeding plate disposed in a plane normal thereto. Consequently, first main branch 25 is divided into first and second sub-branches 27, 28, respectively, (see FIGURE 10) and second main branch 26 is divided into third and fourth sub-branches 30, 31, respectively. These sub-branches are shifted, altered in cross-section to appear as in FIGURE 9, and then flattened again to the FIGURE 8 configuration, but with four layers of pigment 23 (not shown). The main concept here, as explained in said copending application Serial No. 774,305, is to divide and combine portions until the layers 22, 23 become infinitely small to insure thorough mixing.

It is also important to note that, upon discharge of the sub-branches 27, 28, 30 and 31 from the trailing edge of the second wall plate 21A, one sub-branch from first main branch 25 will be combined with a sub-branch from second main branch 26. The first main branch 25, therefore, is now combined of sub-branch 27 forming an original portion thereof, and sub-branch 30 which originally was a part of second main branch 26. Likewise, main branch 26 is now formed from sub-branches 28, 31, see FIGURE 10.

From the foregoing, it will appear that modified main branches 25A, 26A will be intoduced into the next mixing stage of the apparatus shown. One mixing stage may be defined as the baffle structure included between the leading edge of the first (vertical) wall surface 21A to the trailing edge of the second horizontal wall surface 21A. This operation may be understood more clearly from FIGURE 10, wherein modified first main branch 25A is divided into first and second modified sub-branches 32, 33, respectively, and modified second main branch 26A is divided into third and fourth modified sub-branches 34, 35, respectively.

Division of branches into sub-branches, alteration in cross-sectional shape, and re-combining with selected sub-branches from other branches continues throughout the apparatus in the same manner described above. At the discharge end of the mixer sub-branches unite in pairs as shown at 36, 37; 38, 40 (FIGURE 10), and the resulting main branches 41, 42, respectively, flow together as at 43 to produce a new or modified main stream of thoroughly blended materials. Theoretically, this main stream 43 will consist of an infinite number of layers of the starting material 22, 23, with each layer being of infinitesimal thickness. The actual result depends, of course, on the number of mixing stages utilized.

Figure 11:
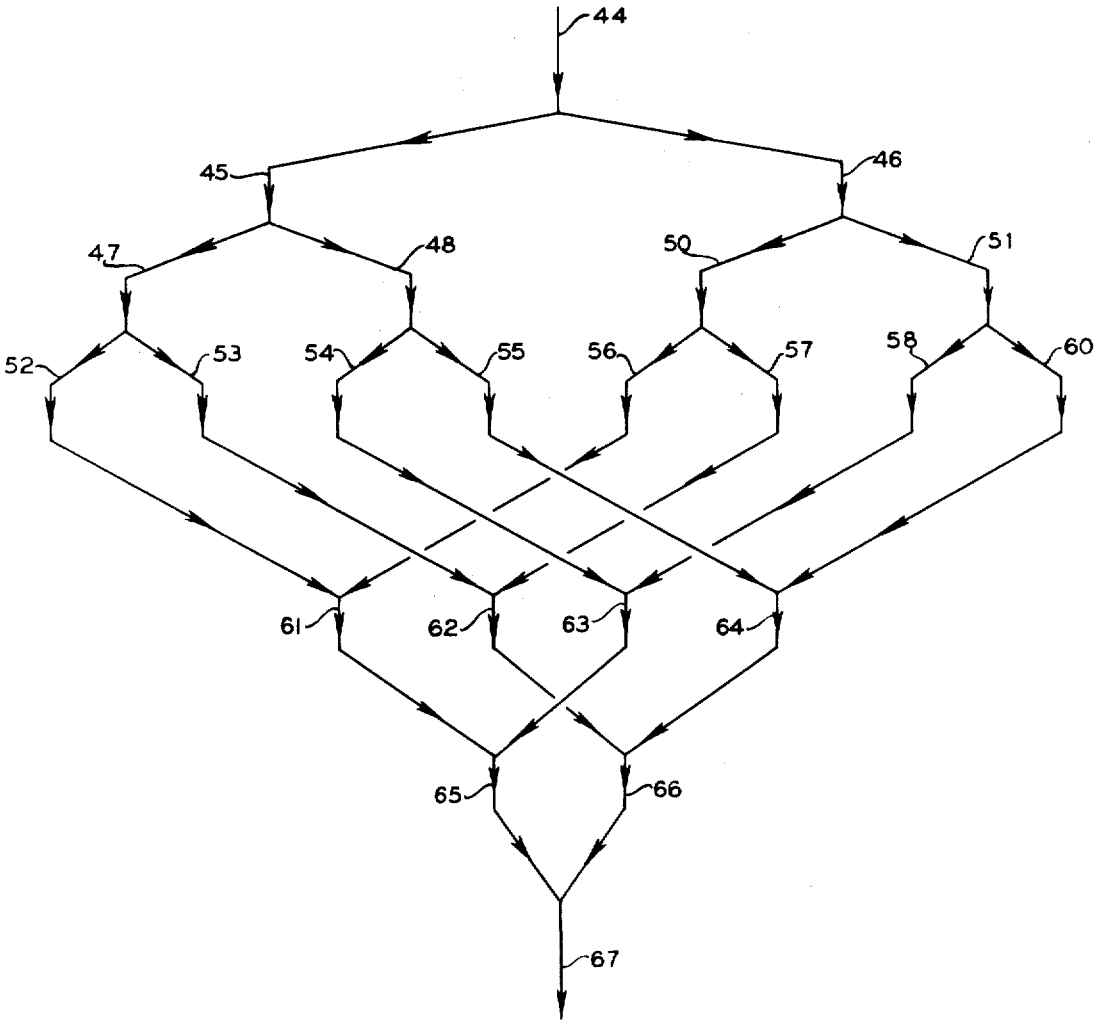
FIGURE 11 is a schematic diagram illustrating an alternative flow system which could be accomplished upon slight modification of the apparatus shown in FIGURE 4.

With attention now directed to FIGURE 11, a slightly different system of dividing and combining will be explained. It will be understood that baffles should be added to the apparatus of FIGURE 4 to prevent combining of sub-branches until the same have been individually divided into the smallest portions desired. The same effect may be obtained, of course, by providing small conduits within the mixer and, for purposes of this discussion, the lines shown in FIGURE 11 may represent such conduits. The same would not be spread out as shown, however, but should be confined to the space required of the illustrated apparatus.

In the modified system, a main stream 44 of viscose, for example, having a layer of pigment, for example, is introduced into the mixer. The present invention obviously is not limited to such a combination of materials, but has been found to blend the same very thoroughly and efficiently. The main stream 44 is divided into first and second main branches 45, 46, respectively, by the first stage of the mixing apparatus. The first main branch 45 is sub-divided into first and second sub-branches 47, 48, while the second main branch 46 is sub-divided into third and fourth sub-branches 50, 51.

At this stage, the alternative system differs from the first embodiment described hereinabove. Instead of combining alternate or preselected ones of these sub-branches, the same are again sub-divided into respective pairs of the eight ramifications 52, 53, 54, 55, 56, 57, 58, and 60, as shown. If further division is deemed unnecessary for thorough mixing, the ramifications are then united in pre-selected pairs to form the four modified sub-branches 61, 62, 63 and 64. These modified sub-branches are next combined in alternate pairs to form modified first and second main branches 65, 66, respectively. These modified main branches are finally united to form a modified or thoroughly mixed main stream 67.

It is pointed out that many modifications of the present invention will be possible. The flat metal plates suitably bent to form tabs clearly relate to only one method of assembling the mixing apparatus. It should be noted in this connection that the mixer shown in FIGURE 4 is not provided with voids which would necessarily occur if only flat plates were used in construction. The voids would serve no useful purpose and have been shown as filled, although in actual practice the surfaces 10', 11' would extend as an additional wall and top, respectively, so that the two walls, top and bottom together will define a tubular structure of square cross section in the embodiment described herein above. It might be found expedient to cast or otherwise form each mixing stage from solid material, or the entire apparatus might be formed in a single operation. Obviously, however, the material from which the same is formed, or the manner of construction, depends on the end use and per se form no part of the present invention.

Inasmuch as other modifications will become apparent to those skilled in this art, it is intended that this invention be limited in scope only to the extent set forth in the following claims.

What is claimed is:

1. A mixing apparatus comprising a conduit of uniform cross section for supplying a main stream of material to be blended, means within said conduit *which extend into contact with said conduit* for dividing said *entire* main stream into first and second branch streams, means within said conduit *which extend into contact with said conduit* for simultaneously sub-dividing said *entire* first branch stream into first and second sub-branch streams and said *entire* second branch stream into third and fourth sub-branch streams, means within said conduit *which extend into contact with said conduit* for directly combining said *entire* first sub-branch stream with said *entire* third sub-branch stream and said *entire* second sub-branch stream with said *entire* fourth sub-branch stream, thereby producing modified first and second branch streams, and means for directly combining said first and second modified branch streams into a modified stream.

2. A mixer apparatus for insertion into a tubular supply conduit having parallel top and bottom walls and parallel first and second side walls extending normally between said top and bottom walls including at least one mixing stage comprising a first divider plate extending normally between said top and bottom walls intermediate said first and second side walls, said first divider plate having leading and trailing edges, a first deflector plate bridging the space between said first divider plate and said first side wall and extending from a point flush with said bottom wall in substantial alignment with the leading edge of said first divider plate to a point intermediate said top and bottom walls in substantial alignment with the trailing edge of said first divider plate, a second deflector plate bridging the space between said first divider plate and said second side wall and extending from a point flush with said top wall in substantial alignment with the leading edge of said first divider plate to a point intermediate said top and bottom walls in substantial alignment with the trailing edge of said first divider plate, a second divider plate extending normally between said first and second side walls intermediate said top and bottom walls, said second divider plate also having leading and trailing edges, the leading edge of which is in substantial alignment with the trailing edge of said first divider plate, a third deflector plate bridging the space between said second divider plate and said top wall and extending from a point intermediate said side walls in substantial alignment with the leading edge of said second divider plate to a point flush with said second side wall in substantial alignment with the trailing edge of said second divider plate, and a fourth deflector plate bridging the space between said second divider plate and said bottom wall and extending from a point intermediate said side walls in substantial alignment with the leading edge of said second divider plate to a point flush with said first side wall in substantial alignment with the trailing edge of said second divider plate.

3. A mixer apparatus as set forth in claim 2 and further comprising a plurality of said mixing stages, each successive stage being reversed from the immediately preceding stage.

References Cited

The following references cited by the Examiner, are of record in the patented file of this patent or the original patent.

UNITED STATES PATENTS

| | | | |
|---|---|---|---|
| 832,400 | 10/1906 | Lyons | 259—150 |
| 2,085,132 | 6/1937 | Underwood | 259—4 |
| 2,230,221 | 2/1941 | Fitch | 165—172 |
| 2,584,827 | 2/1952 | Bailey | 259—4 |
| 2,861,596 | 11/1958 | Ipsen | 138—38 |

ROBERT W. JENKINS, Primary Examiner